United States Patent [19]
Hogan

[11] Patent Number: 5,217,557
[45] Date of Patent: Jun. 8, 1993

[54] PROCESS FOR THE PRODUCTION OF THERMOPLASTIC LEVEE GATES

[76] Inventor: John F. Hogan, 3017 Claiborne Cir., Monroe, La. 71201

[21] Appl. No.: 848,313

[22] Filed: Mar. 9, 1992

[51] Int. Cl.$^5$ .................. B29C 47/20; B32B 31/18
[52] U.S. Cl. .................. 156/244.13; 156/244.14; 156/244.19; 156/244.22; 156/244.24; 156/252; 239/342; 239/347; 405/87; 405/91; 405/107; 405/110; 405/115
[58] Field of Search .................. 156/137, 142, 244.13, 156/244.14, 244.19, 244.22, 244.24, 252, 253, 438; 239/342, 247; 405/87, 91, 107, 110, 115

[56] References Cited

U.S. PATENT DOCUMENTS

| | | | |
|---|---|---|---|
| 3,011,930 | 12/1961 | Dworak | 156/252 |
| 3,018,882 | 1/1962 | Ferguson | 156/244.14 |
| 3,019,573 | 2/1962 | Navikas | 156/252 |
| 3,130,647 | 4/1964 | Anderson et al. | 93/35 |
| 3,743,567 | 7/1973 | Abler | 156/252 |
| 3,855,800 | 12/1974 | Ganzinotti | 61/29 |
| 4,021,283 | 5/1977 | Welkert | 156/244 |
| 4,139,159 | 2/1979 | Inoue et al. | 156/252 |
| 4,231,832 | 11/1980 | Welkert | 156/244.14 |
| 4,541,569 | 9/1985 | Langa | 239/450 |
| 4,696,598 | 9/1987 | Tsuji et al. | 405/115 |

FOREIGN PATENT DOCUMENTS 1-178436  7/1989  Japan .......................... 156/244.14

*Primary Examiner*—Caleb Weston
*Attorney, Agent, or Firm*—David L. Ray

[57] ABSTRACT

A levee gate and the process for the production thereof. The levee gate of the invention includes a rectangular sheet of thermoplastic material with a rectangular sleeve located on one edge of the thermoplastic material, the rectangular sleeve being a portion of the rectangular sheet fused to the rectangular sheet. The process for the production of the levee gate includes extruding a cylindrical tube of thermoplastic material, inflating the cylindrical tube as it is extruded to provide an inflated length of tube, flattening the inflated length of tube without fusing the opposed walls of the tube to each other, and continuously fusing a portion of the opposed walls together to form a seam.

15 Claims, 4 Drawing Sheets

PROCESS FOR THE PRODUCTION OF THERMOPLASTIC LEVEE GATES

BACKGROUND OF THE INVENTION

1. Field of the Invention

The invention relates to devices for preventing erosion of earthen levees between adjoining fields for growing rice or similar agricultural crops during the flooding of the fields. In particular the present invention relates to coated, woven thermoplastic rice levee gates or sheets having a sleeve into which a wooden plank may be inserted to anchor the levee gate to the earth beneath the gate.

2. Description of the Related Art

As is known in the art, rice is commonly grown in fields which must be periodically flooded with water, and levees made of earth are built around the fields to contain and channel the water in the fields. When it is desired to remove water from a field or to flow water from one field to another, or to evenly distribute water in a single field, commonly a hole or U-shaped channel is made in a levee by removing a portion of a levee to permit water to flow therethrough.

As water flows through the hole in the levee, erosion occurs and an undesired portion of the levee can be eroded by water flowing through the levee if erosion of the levee is not prevented or controlled. To prevent such erosion, devices referred to in the art as "levee gates" are employed.

Levee gates of the prior art are rectangular sheets of coated, woven polyethylene. The coated, woven polyethylene sheets have a hem sewn therein parallel to one edge of the rectangular sheet. The hem is sewn sufficiently far from one edge of the sheet to form a sleeve for receipt of an anchor such as a common elongated wooden plank having an approximate 2" by 4" rectangular cross section to be inserted therein. The wooden plank functions as an anchor to hold the sheet in place and prevent water flowing over the sheet from washing the sheet away. A metal rod or other elongated member may be used to replace the wooden plank if desired.

After a hole is made in a levee containing water on one side thereof, the levee gate described above is placed on the bottom of the hole to prevent erosion and enlargement of the hole. The sleeve of the levee gate containing the anchor is placed on the upstream side of the levee parallel to the levee to prevent the levee gate from being washed away by the water flowing through the hole or channel in the levee. The levee gate may also extend up the sides of the U-shaped hole or channel in the levee if desired to prevent erosion of the side of the U-shaped hole or channel in the levee.

U.S. Pat. No. 4,696,598 discloses an erecting/lying-down dam or sluice gate made of flexible sheet. The dam has a flexible cover attached to a bottom sheet by fittings with corrugations formed between the fittings so that upon deflation the cover conforms to the surface of the corrugations, minimizing any floating cover portion. The corrugations may be formed as pipelike members, as molded portions integral with the bottom sheet or as part of the concrete foundation. Preferably the length between the fittings measured along the corrugation surface is at least 1.1 times the linear length therebetween. The corrugations are also preferably recessed to extend no higher than the bottom of the riverbed.

U.S. Pat. No. 4,541,569 discloses a drip irrigation conduit and method of making the same which is an irrigation conduit comprising an extruded tube having a peripheral wall and at least one elongated passage, and an elongated supply tube having an elongated supply passage. The supply tube is formed of sheet material joined together along longitudinally extending portions to form a seam. A region of the sheet material extends at least part way around the perimeter of the extruded tube, and the extruded tube is retained on such region of the sheet material. Transfer ports extend between the passages of the two tubes and discharge ports extend from the passage of the extruded tube to the exterior of the irrigation conduit.

U.S. Pat. No. 4,231,832 discloses a process of manufacturing laminated web in which the gas and light barrier properties of a web of thermoplastic bags designed for aseptic packaging are improved by laminating a material of high gas and light imperiousness, such as metal foil, to the thermoplastic bag material during a blown film extrusion process. In one embodiment a pair of foil laminates are applied to opposite sides of the inflated length of a blown tube between the extruder and a first pair of nip rolls, with the laminates being pressed into opposite sides of the inflated tube by rollers which flatten the tube at their points of contact to provide flat surfaces for the laminates being applied to the tube. The resulting laminated web has a pair of aligned, uncovered strips running the length of the web along which a slit-seal is made to provide a pair of webs each having a layer of foil or other material laminated to all but one longitudinal edge thereof. In another embodiment a single sheet of foil is applied to a tube of film using, for example, a conventional tube former, with the foil wrapping less than the full circumference of the tube to provide a single web having an uncovered section running longitudinally thereof.

U.S. Pat. No. 4,021,283 discloses a method of making aseptic packaging which are manufactured through a process which includes making an aseptic web of bags by first blow-extruding a continuous, closed thermoplastic tube using a non-contaminating gas, dividing the tube by means of partial, transverse heat seals into a series of interconnected bags intercommunicating with each other in a closed system by means of a continuous channel running across their open mouths an then, while maintaining the closed, and hence, sterile condition of the web of bags, filling the bags with a sterile product and sealing the bags, to produce sealed, aseptic packages.

U.S. Pat. No. 3,855,800 discloses inflatable barriers for watercourses, for example a river, and of the kind including at least one inflatable enclosure secured to an element anchored directly or indirectly in such watercourse and constructed in such a fashion as to prevent erosion. In order to enable the barriers to be easily removed from the watercourse, for example to be used in another location, the invention provides devices for anchoring the enclosure in relation to the watercourse bed, and this device incorporates an anchoring strip of supple material such as rubber that is securable to the bed, and this strip has a free extremity or edge provided with one or more devices for removably connecting the barrier to the strip. The anchoring strip may be secured to a rigid member arranged to be laid down in the soil of the bed of the watercourse and this rigid member may take the form of a block of masonry. Alternatively, the anchoring strip may be embedded in the soil of the bed of the watercourse and this rigid member may take the form of a block of masonry. Alternatively, the anchoring strip may be embedded in the soil of the watercourse by digging out a transverse trench using the removed aggregates to form a temporary dam, laying the anchoring strip in the trench preferably at an angle of 45° to the plane of the bed, and then filling up the trench with the aggregates previously dug out, thus to secure the strip in relation to the soil of the bed.

U.S. Pat. No. 3,130,647 discloses a duplex packaging material including a loosebonded multiple-wall bag, in which the multiple wall includes inner and outer layers of material, and a method of making the same, the method including supplying a first web of bag wall material having properties of resilience and heat-sealability, supplying a second web of bag wall material having a property of relative non-resilience in comparison to the first web of bag wall material, bringing together the first and second webs to superimpose one upon the other, forming a loose-bonded multiple-wall sheet material by effecting a heat seal between the webs over spaced areas which are very limited in relation to the total contacting area of the webs, and forming a multiple-wall, loose-bonded bag from such sheet material by folding a section of the sheet material, securing together longitudinal marginal edge portions of the sheet material and securing together marginal edge portions of the sheet material at least one end of the portion of sheet material, whereby the multiple webs forming the walls of the bag are secured together at limited areas in relation to the total area of the walls.

SUMMARY OF THE INVENTION

In accordance with the present invention there is provided a levee gate and a process for the production thereof. The levee gate is a rectangular sheet of thermoplastic material having four edges, with a rectangular sleeve located on one edge of the thermoplastic material, the rectangular sleeve being a portion of the rectangular sheet fused to the rectangular sheet. The process for the production of the levee gate includes extruding a cylindrical tube of thermoplastic material, inflating the cylindrical tube as it is extruded to provide an inflated length of tube, flattening the inflated length of tube without fusing the opposed walls of the tube to each other, and continuously fusing a portion of the opposed walls together to form a seam.

DESCRIPTION OF THE PREFERRED EMBODIMENTS

Figure 2:
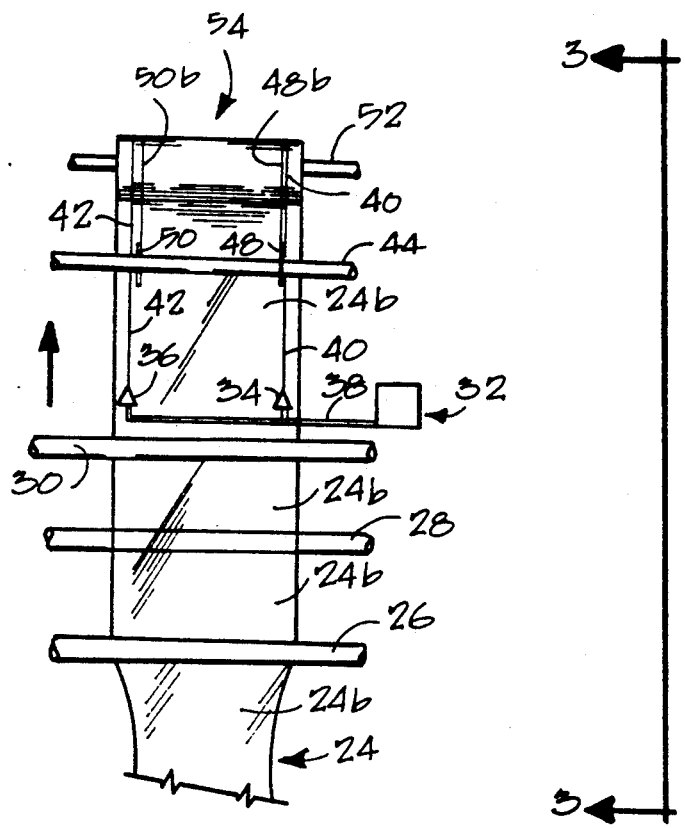
FIG. 2 is a top view of an additional portion of the process shown in FIG. 1.
Figure 1:
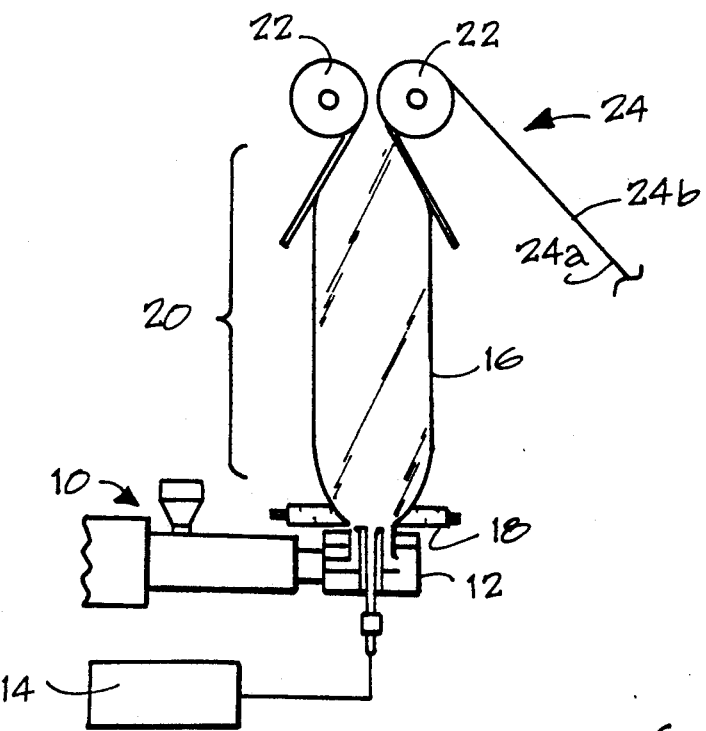
FIG. 1 is an elevational view showing a portion of a process for making a preferred embodiment of a levee gate of the invention.
Figure 3:
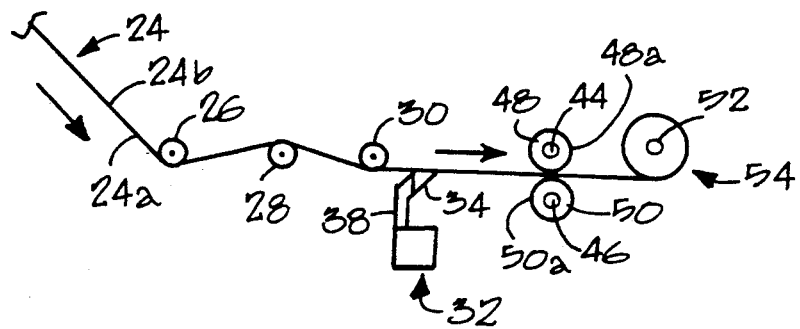
FIG. 3 is a side elevational view of FIG. 2 taken along lines 3—3 of FIG. 2.
Figure 7:
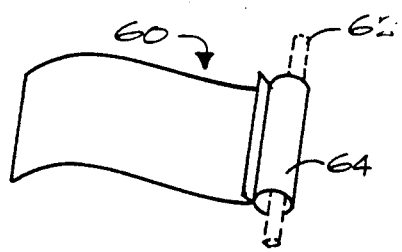
FIG. 7 is a perspective view of the levee gate of the invention have an anchor shown in phantom lines inserted therein.
Figure 9:
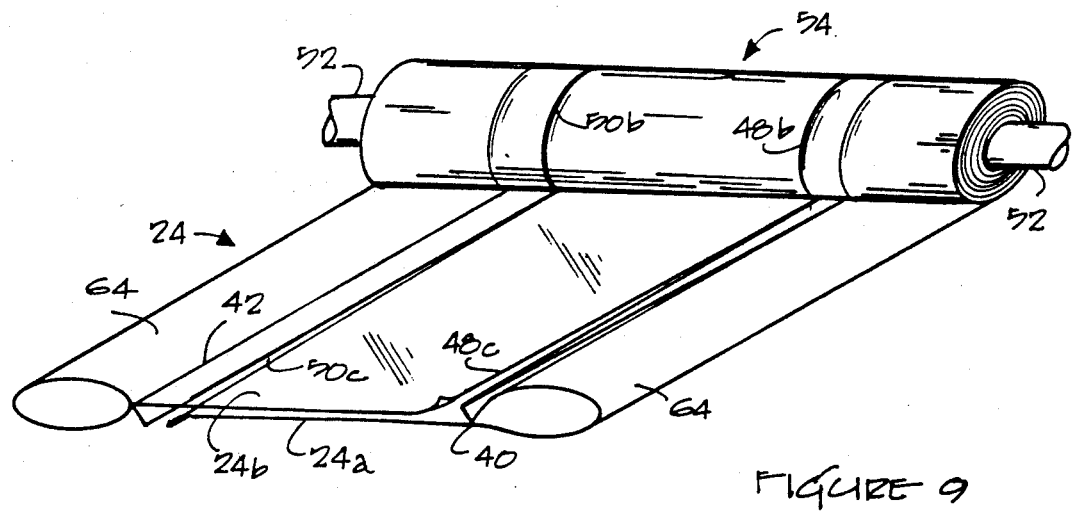
FIG. 9 is a perspective view of a roll of levee gates produced by a preferred process of the invention.

Referring now to the drawings, and in particular to FIGS. 1, 2, 3, 7 and 9, in FIGS. 1–3 is shown a preferred process for producing the levee gate shown in FIGS. 7 and 9. An extruder 10 extrudes in molten form a tube of thermoplastic material through a die 12. The thermoplastic material may be polyethylene, polypropylene, polyvinyl chloride, or the like, although polyethylene is preferred.

In the drawings the tube is shown to be clear and transparent, but preferably a pigment is added to make the tube the desired color. Extruder 10 and die 12 are of conventional design such as that shown in U.S. Pat. No. 4,231,832, which is hereby incorporated by reference. A non-contaminating gas, such as sterile air, is conveyed into the tube from a source 14 to provide an inflated tube 16. A cooling ring 18 is positioned just downstream of the die 12 to accelerate the solidification of the thermoplastic material.

The blown tube 16 travels upward in the direction indicated by the arrow in FIG. 1 and extends vertically upwardly from the die 12. The inflated length 20 of the tube 16 thus extends upward from the die 12 to a first pair of nip or flattening rolls 22—22, which flatten the tube 16 and which are usually positioned some twenty fee or more above the die 12. Within the inflated length 20 of the tube 16 the pair of nip or flattening rolls 22 contact opposite sides of the tube 16 and form the flattened tube generally indicated by the numeral 24, which flattened tube 24 includes bottom flattened tube portion 24a and top flattened tube portion 24b of a desired width as shown in FIGS. 1–3 and 9.

As shown in FIGS. 2 and 3, the two flattened tube portions 24a and 24b are conveyed under roll 26, over roll 28, and under roll 30. Immediately downstream from roller 30 is heat sealing unit 32. Heat sealing unit 32 has two heads 34 and 36 connected to heat sealing unit by pipe 38. Preferably heat sealing unit 32 is a conventional hot air heat sealing unit known in the art which directs a stream of hot air from heat sealing unit 32 through pipe 38 to heads 34 and 36. Heads 34 and 36 direct the flow of hot air onto the bottom flattened tube portion 24a to heat the flattened tube 24 to a temperature sufficient to fuse the bottom flattened tube portion 24a to the top flattened tube portion 24b to form two parallel seals or seams 40 and 42, respectively, in flattened tube 24. If desired, other conventional methods other than hot air heat sealing such as high energy light, microwaves, and the like may be utilized to fuse the bottom flattened tube portion 24a to the top flattened tube portion 24b to form seals or seams 40 and 42 in flattened tube 24, although heat sealing with hot air, as shown in the drawings and described above, is preferred.

Down stream from heat sealing heads 34 and 36 are perforating rollers 44 and 46. Perforating roller 44 is located above perforation roller 46. Perforating discs 48 and 50 are rigidly connected to perforating rollers 44 and 46, respectively. Perforating discs 48 and 50 have a plurality of teeth 48a and 50a. Teeth 48a pierce the top 24b of flattened tube 24 and teeth 50a pierce the bottom flattened tube portion 24a to form an aligned plurality of perforations therein indicated by lines 48b and 50b shown in FIGS. 2 and 9, the perforations being separated by the distance between adjacent teeth. The perforations enable the top 24b of flattened tube 24 and the bottom flattened tube portion 24a to be easily torn along the aligned perforations to form the levee gate of the invention shown in FIG. 7. If desired the perforating step could be omitted and the bottom flattened tube portion 24a and the top flattened tube portion 24b could be cut with a knife or scissors from roll 54 shown in FIG. 9 along lines identical to 48b and 50b, but it is preferred to perforate as described above for ease of removal and certainty of dimension in formation of the levee gates from roll 54.

Down stream from perforating rollers 44 and 46 is storage roller 52. An intermediate roller (not shown) may be placed downstream from perforating rollers 44 and 46 between roller 52 and perforating rollers 44 and 46 to maintain the horizontal position of the double seamed, double perforated flattened tube 24 as it exits from between perforating rollers 44 and 46, or roller 52 may be continuously elevated as the flattened tube 24 accumulates on roller 52 if desired.

After a desired amount of the double seamed, double perforated, flattened tube 24 accumulates on roller 52, the roll of finished product generally indicated by the numeral 54 is removed for shipment to the consumer, and the process is repeated.

In FIG. 7 is shown the levee gate of the invention generally indicated by the numeral 60 after levee gate 60 has been removed from roll 52. As can be seen in FIG. 9, roll 52 contains two levee gates 60 for each lineal foot of double seamed, double perforated flattened tube 24 removed from roll 52.

To remove a levee gate 60 from roll 52, roll 62 is rotated as shown in FIG. 9 until a desired length of double seamed, double perforated flattened tube 24 extends therefrom. The flattened tube 24 is then cut parallel to the roller 52 at the desired location, and is separated by tearing by hand along perforations 48b and 50b to form two levee gates 60—60. In FIG. 9, the seams 50b and 48b are shown partially separated at 48c and 50c.

As can be seen in FIG. 7, the levee gate is stretched out horizontally. An anchor 62 may then be inserted in the sleeve 64 formed by the seam in the levee gate 60. The anchor 62 may be a wooden plank, metal pipe, or the like. Anchor 62 helps hold the levee gate 60 to the ground when the levee gate 62 is being used to prevent erosion of a hole made in a levee to release water therethrough.

Figure 6:
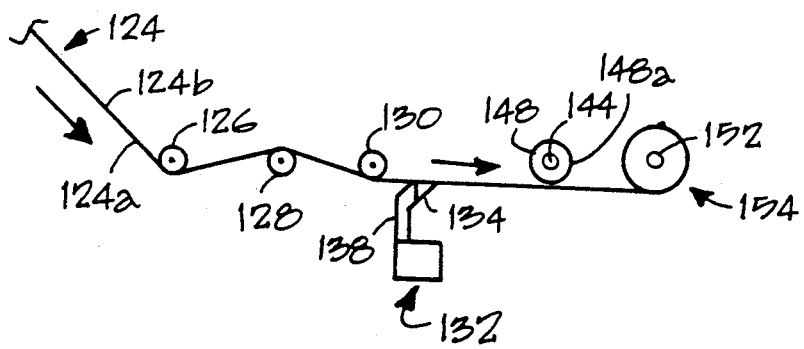
FIG. 6 is a side elevational view of FIG. 5 taken along lines 6—6 of FIG. 2.
Figure 5:
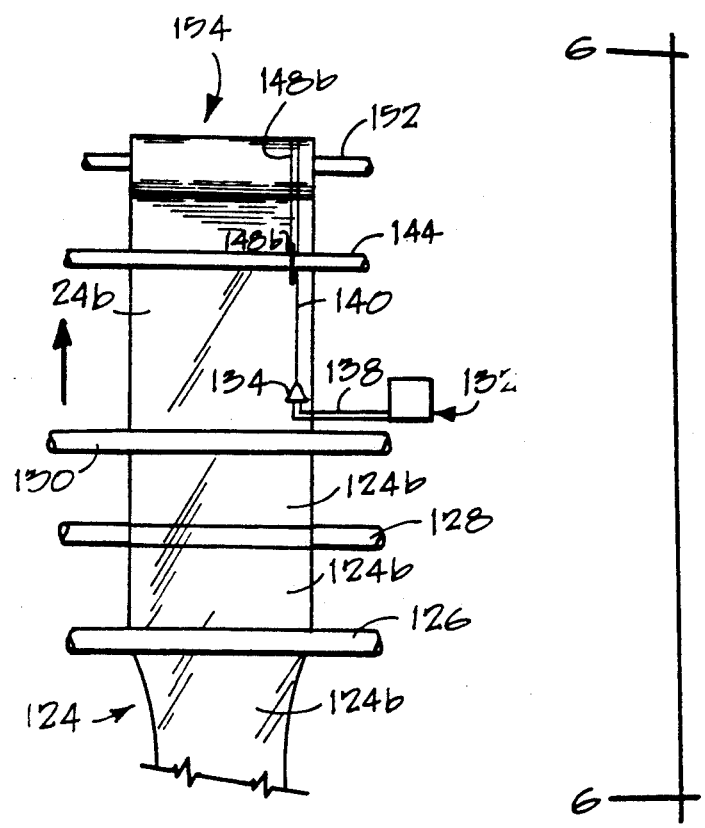
FIG. 5 is a top view of an additional portion of the process shown in FIG. 4.
Figure 4:
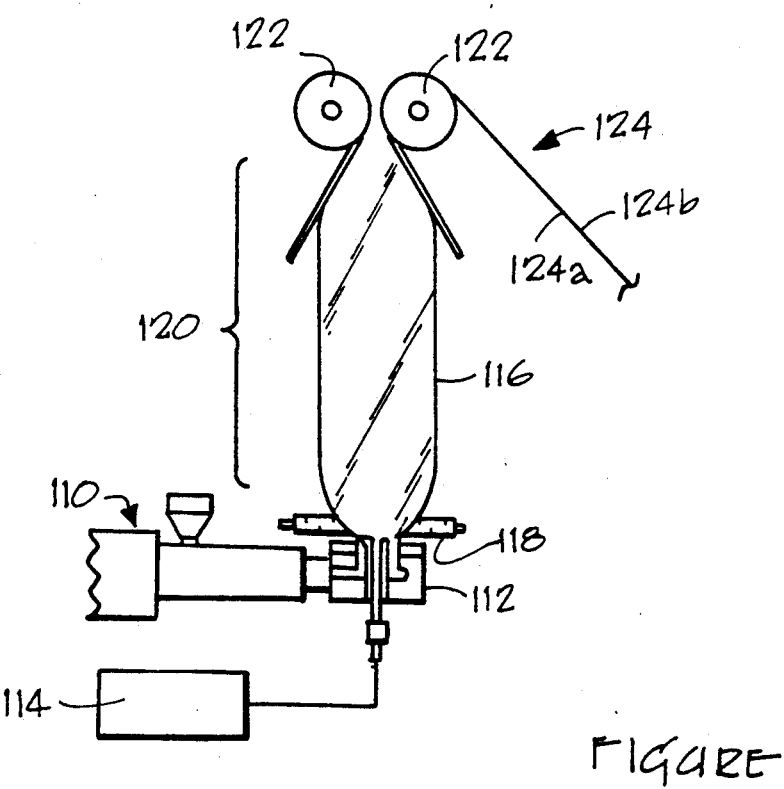
FIG. 4 is an elevational view showing a portion of the process for making the most preferred embodiment of the levee gate of the invention.
Figure 8:
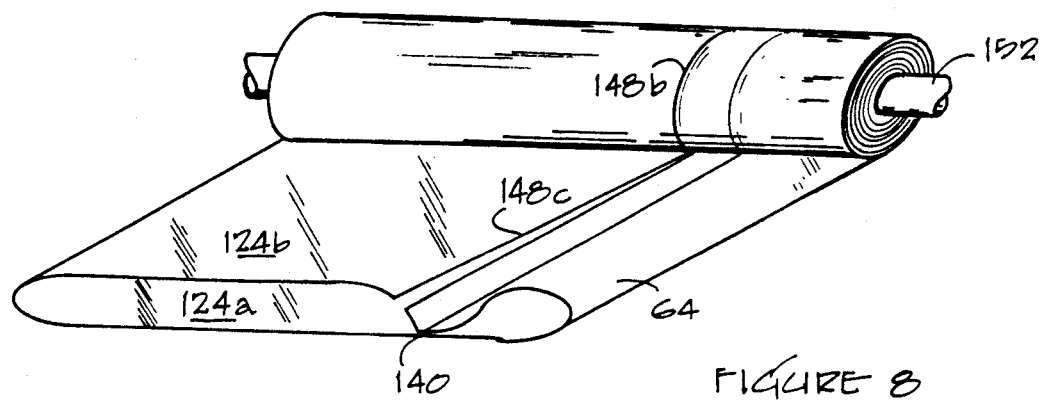
FIG. 8 is a perspective view of a roll of levee gates produced by the most preferred process of the invention.

Referring now to the most preferred embodiment shown in FIGS. 4, 5, 6, and 8, in FIGS. 4–6 is shown the most preferred process for producing the levee gate shown in FIGS. 7 and 8. An extruder 110 extrudes in molten form a tube of thermoplastic material through a die 112. In the drawings the tube is shown to be clear and transparent, but preferably a pigment is added to make the tube the desired color. Extruder 110 and die 112 are of the same conventional design shown in FIGS. 1-3. A non-contaminating gas, such as sterile air, is conveyed into the tube from a source 14 to provide an inflated tube 116. A cooling ring 118 is positioned just downstream of the die 112 to accelerate the solidification of the thermoplastic material.

The blown tube 116 travels upward in the direction indicated by the arrows and extends vertically upwardly from the die 112. The inflated length 20 of the tube 16 thus extends upward from the die 12 to a first pair of nip or flattening rolls 22—22, which flatten the tube 16 and which are usually positioned some twenty fee or more above the die 12. Within the inflated length 20 of the tube 16 the pair of nip or flattening rolls 22 contact opposite sides of the tube 16 and form the flattened tube generally indicated by the numeral 24, which flattened tube 24 includes bottom flattened tube portion 24a and top flattened tube portion 24b of a desired width as shown in FIGS. 1-3 and 9. The inflated length 120 of the tube 116 thus extends from the die 112 to a first pair of nip or flattening rolls 122—122, which flatten the tube 116 and which are usually positioned some twenty fee or more above the die 112. Within the inflated length 120 of the tube 116 the pair of nip or flattening rolls 122 contact opposite sides of the tube 116 to form the flattened tube generally indicated by the numeral 124, which flattened tube 124 includes bottom flattened tube portion 124a and top flattened tube portion 124b as shown in FIGS. 4–6 and 8.

The two flattened tube portions 124a and 124b are conveyed under roll 126, over roll 128, and under roll 130 as shown in FIG. 5. As can be seen in FIGS. 5 and 6, immediately downstream from roller 130 is heat sealing unit 132. Heat sealing unit 132 has one head 134 connected thereto by pipe 138. Preferably heat sealing unit 132 is a conventional hot air heat sealing unit known in the art which directs a stream of hot air from heat sealing unit 132 through pipe 138 to head 134. Head 134 directs the flow of hot air onto the bottom flattened tube portion 124a to heat the flattened tube 124 to a temperature sufficient to fuse the bottom flattened tube portion 124a to the top flattened tube portion 124b to form a seal or seam 140 in flattened tube 124. If desired, other conventional methods other than hot air heat sealing such as high energy light, microwaves, and the like may be utilized to fuse the bottom flattened tube portion 124a to the top flattened tube portion 124b to form a seal or seam 140 in flattened tube 124, although heat sealing with hot air, as shown in the drawings and as described above, is preferred.

Down stream from heat sealing heads 134 is perforating roller 144. Perforating roller 44 is located above flattened tube 124, although it could be located below if desired. Perforating disc 148 is rigidly connected to perforating roller 144. Perforating disc 148 has a plurality of teeth 148a. Teeth 148a pierce top flattened tube portion 124b to form a series of perforations therein indicated by line 148b, the perforations being separated by the distance between adjacent teeth. The perforations enable the top flattened tube portion 124b and the bottom flattened portion 124a to be easily torn along the perforations to form the levee gate of the invention shown in FIG. 7. If desired the perforating step could be omitted and the bottom flattened tube portion 124a and the top flattened tube portion 124b could be cut with a knife or scissors from roll 154 shown in FIG. 8 along a line identical to 148b, but it is preferred to perforate as described above for ease and certainty of dimension in formation of the levee gates from roll 154.

Down stream from perforating roller 144 is storage roller 152. An intermediate roller (not shown) may be placed downstream from perforating roller 144 between roller 152 and perforating roller 144 to maintain the horizontal position of double seamed, double perforated flattened tube 124 as it exits from perforating roller 144, or roller 152 may be continuously elevated as the flattened tube 124 accumulates on roller 152.

After a desired amount of double seamed, double perforated, flattened tube portion 124 accumulates on roller 152, the roll of finished product generally indicated by the numeral 154 is removed for shipment to the consumer and the process is repeated.

In FIG. 7 is shown the levee gate of the invention generally indicated by the numeral 60 after levee gate 60 has been removed from roll 52 or 152. As can be seen in FIG. 9, roll 152 contains one levee gate 60 for each lineal foot of single seamed, single perforated flattened tube 124 removed from roll 152.

To remove a desired length of levee gate 60 from roll 152, roll 162 is rotated as shown in FIG. 8 until a desired length of flattened tube 124 extends therefrom. The flattened tube 124 is then cut parallel to the roller 152 at the desired location. The flattened tube 124 is then separated by tearing by hand along perforations 148*b* to form a single levee gate 60. In FIG. 8, the seam 148*b* is shown partially separated at 148*c*.

As can be seen in FIG. 7, the levee gate made by the most preferred process shown in FIGS. 4, 5, 6, and 8 is identical in final form the levee gate made by the process shown in FIGS. 1, 2, 3, and 9. Both levee gates have a heat sealed seam forming a sleeve 64 for the insertion of an anchor 62. In the process shown in FIGS 1-3 and 9, two levee gates are available per lineal foot of roll 54, whereas in the process shown in FIGS. 4-6 and 8, one levee gate is available for each lineal foot of roll 154.

It can thus be seen from the above that the present invention provides a new levee gate and a process for the production thereof. The levee gate of the invention requires no sewing to create a seam, and is made quickly and economically from a continuous sheet of thermoplastic material rather than an expensive coated, woven plastic material.

Although the preferred embodiments of the invention have been described in detail above, it should be understood that the invention is in no sense limited thereby, and its scope is to be determined by that of the following claims:

What is claimed is:

1. A process for the production of thermoplastic levee gates for preventing soil erosion of earthen levees comprising:
   a. extruding a cylindrical tube of thermoplastic material,
   b. inflating said cylindrical tube as it is extruded to provide an inflated length of said cylindrical tube,
   c. flattening the inflated length of tube without fusing the opposed walls of said tube to each other to form two opposed rectangular sheets,
   d. continuously fusing a portion of the opposed walls of said two rectangular sheets together, said portion which is fused forming a seam, said seam forming a sleeve along one edge of said two rectangular sheets, and
   e. continuously perforating a plurality of holes in one of said rectangular sheets.

2. The process of claim 1 wherein said fusing comprises blowing hot air onto a portion of the opposed walls of said two rectangular sheets to form said seam.

3. The process of claim 1 wherein said seam is aligned parallel to the direction in which said rectangular sheets are moving.

4. The process of claim 1 wherein a second portion of the opposed walls of said two rectangular sheets is continuously fused together, said second portion which is fused forming a second seam parallel to said seam, said second seam forming a second sleeve along one edge of said two rectangular sheets.

5. The process of claim 1 wherein said plurality of holes are aligned in a line parallel to said seam.

6. The process of claim 5 wherein said plurality of holes are made in said rectangular sheet by perforating disc means.

7. The process of claim 6 wherein said disc means has teeth means thereon for perforating one of said two rectangular sheets.

8. A process for the production of thermoplastic levee gates for preventing soil erosion of earthen levees comprising:
   a. extruding a cylindrical tube of thermoplastic material,
   b. inflating said cylindrical tube as it is extruded to provide an inflated length of said cylindrical tube,
   c. flattening the inflated length of tube without fusing the opposed walls of said tube to each other to form two opposed rectangular sheets,
   d. continuously fusing a portion of the opposed walls of said two rectangular sheets together, said portion which is fused forming a seam, said seam forming a sleeve along one edge of said two rectangular sheets,
   e. continuously fusing a second portion of the opposed walls of said two rectangular sheets together, said second portion which is fused forming a second seam parallel to said seam, said second seam forming a second sleeve along one edge of said two rectangular sheets, and
   f. continuously perforating a plurality of holes in each of said rectangular sheets.

9. The process of claim 8 wherein said fusing comprises blowing hot air onto a portion of the opposed walls of said two rectangular sheets to form said seam.

10. The process of claim 8 wherein said seam is aligned parallel to the direction in which said rectangular sheets are moving.

11. The process of claim 8 wherein said thermoplastic material is polyethylene.

12. The process of claim 8 wherein said plurality of holes in each of said rectangular sheets are aligned in a line parallel to said seam.

13. The process of claim 12 wherein said plurality of holes are made in said rectangular sheets by two perforating disc means.

14. The process of claim 13 wherein each of said disc means has teeth means thereon for perforating one of said two rectangular sheets.

15. The process of claim 14 wherein said thermoplastic material is polyethylene.

* * * * *